| United States Patent [19] | [11] Patent Number: 4,752,643 |
| Imanishi et al. | [45] Date of Patent: Jun. 21, 1988 |

[54] TRANSPARENT POLY-P-PHENYLENE-TEREPHTHALA-MIDE FILM

[75] Inventors: Taichi Imanishi; Shigemitsu Muraoka, both of Nobeoka, Japan

[73] Assignee: Asahi Kasei Kogyo Kabushiki Kaisha, Japan

[21] Appl. No.: 847,741

[22] Filed: Apr. 3, 1986

[30] Foreign Application Priority Data

Apr. 4, 1985 [JP] Japan .................................. 60-71663
Apr. 4, 1985 [JP] Japan .................................. 60-71664
May 7, 1985 [JP] Japan .................................. 60-95551
Aug. 13, 1985 [JP] Japan .................................. 60-178283
Oct. 2, 1985 [JP] Japan .................................. 60-218027
Oct. 4, 1985 [JP] Japan .................................. 60-220225

[51] Int. Cl.$^4$ ..................... C08G 69/46; C08G 69/32
[52] U.S. Cl. ................................. 528/348; 264/212; 428/474.4
[58] Field of Search ............................ 528/348, 347

[56] References Cited

U.S. PATENT DOCUMENTS 3,869,429 3/1975 Blades ................................. 528/348

Primary Examiner—Harold D. Anderson
Attorney, Agent, or Firm—Finnegan, Henderson, Farabow, Garrett & Dunner

[57] ABSTRACT

There is presented a poly-p-phenyleneterephthalamide film which is excellent in transparency, sufficiently oriented not only in the MD direction but also in the TD direction of the film, having high strength, elongation, modulus and dimensional stability in both longitudinal and lateral directions, and is also excellent in flatness. The film can be produced by forming an optically anisotropic dope comprising a poly-p-phenyleneterephthalamide having an $\eta$inh of 2.5 dl/g or higher and an inorganic strong acid type solvent into a film-shaped dope on a support surface, converting the dope into an optically isotropic dope by water absorption, coagulating the dope, then washing the coagulated product and drying while restricting it shrinkage.

7 Claims, 1 Drawing Sheet

FIG. I
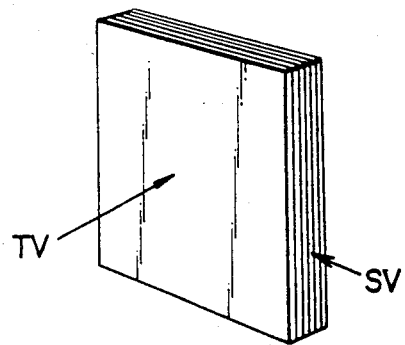
FIG. 2
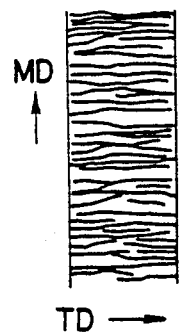

TRANSPARENT POLY-P-PHENYLENE-TEREPHTHALAMIDE FILM

BACKGROUND OF THE INVENTION

1. Field of the Invention

This invention relates to a film comprising a poly-p-phenylene-terephthalamide (herein after called PPTA) and the process for producing the same, more particularly to a PPTA film which is transparent and exhibits excellent mechanical characteristics both in the longer direction of the film (hereinafter abbreviated as the MD direction) and the width direction (hereinafter abbreviated as the TD direction) due to its excellent plane orientation characteristics or a PPTA film which is transparent and exhibits excellent mechanical characteristics, being particularly excellent in mechanical characteristics in monoaxial direction and also having practically satisfactory mechanical properties even in the direction perpendicular to said direction, and also to the processes for producing those films.

2. Description of the Related Art

PPTA has a particularly excellent crystallinity and a high melting point and, due to its rigid molecular structure, has advantageous heat resistance and high mechanical strength, and it is a polymeric material which is particularly attracting attention in recent years. It is also reported that the fibers spun from a concentrated solution showing optical anisotropy exhibit high strength and modulus and they have been already industrially practiced. Proposals about application of the polymer for films still involve a number of tasks in practical performance or manufacturing techniques to be solved. Concerning the method for production of PPTA films, while a polymer of high molecular weight is required, no practical example of its film has yet been known. One of the problems possessed by PPTA films is that its useful polymer of high molecular weight is difficultly soluble in any organic solvents and an inorganic strong acid such as sulfuric acid must be used as the solvent. In order to circumvent this problem, for example, Japanese Patent Publication No. 45421/1981 discloses an attempt in which the polymer is made soluble in an organic solvent by copolymerization of a unit in which halogen groups are introduced into the aromatic nucleus of a liniarly para-oriented aromatic polyamide with an aromatic polyamide having no substituent on the aromatic nucleus other than PPTA, and a film is obtained therefrom. Also, U.S. Pat. No. 3,966,686 discloses films of polyamide hydrazide copolymers or aromatic nucleus-substituted polymers. However, these methods have the drawbacks such that the monomers are expensive to make the cost higher and, besides that the advantageous heat resistance and crystalinity possessed by PPTA are impaired.

On the other hand, when a rigid polymer is dissolved in a solvent, it has been clarified theoretically and experimentaly long before that a liquid crystal is constituted under certain temperature conditions at a certain polymerization degree or higher and a certain concentration or higher [P. J. Flory: Proc. Roy. Soc., A234, 73, (1956)].

In recent years performances demanded for films which are required to have mechanical properties in monoaxial direction, for example, base films for magnetic tapes, etc., are becoming increasingly higher. Accordingly if a polymer solution exhibiting optical anisotropy under such a liquid crystal as mentioned above can be extruded through a slit without disturbance of the orientation of the liquid crystal to obtain a film, it can be expected to be a film having high strength and high modulus. Actually, U.S. Pat. No. 3,767,756 and U.S. Pat. No. 3,869,429 disclose a process comprising extruding an aromatic polyamide solution through a short air layer into a coagulation bath to obtain high physical properties However, according to this process only the mechanical strength in the MD direction of the film is strong, but the mechanical strength in the TD direction perpendicular thereto is extremely weak, is easily bursted and further susceptible to fibrilation. Moreover, since the polymer has a domain structure gathered as liquid crystals, the gathered domain structure remains to give a film which is generally opaque.

Accordingly, various processes for producing a film involving no such problem as mentioned above have been variously investigated. For example, Japanese Patent Publication No. 35088/1982 teaches that a film with good isotropy can be obtained by casting a liniarly para-oriented aromatic polyamide solution having optical anisotropy through a ring die by use of the inflation method in the state of a dope simultaneously in biaxial directions, followed by wet coagulation. However, the film obtained had the drawback of low mechanical properties.

In Japanese Patent Publication No. 5407/1984 and Japanese Laid-open Patent Publication No. 132674/1979, it has been proposed to orient biaxially in the extruded direction and the direction perpendicular thereto during extrusion by extruding an optically anisotropic or optically isotropic dope of a liniarly para-oriented aromatic polyamide through a die while giving mechanically a shearing force in the extruded direction and the direction perpendicular thereto in the die. However, this method had the drawback that the structure of the die is complicated to a disadvantage in industrial practice. Further, in J. Appl. Polym. Sci., Vol. 27, No. 8, P. 2965–2985 (1982), it is proposed to obtain a biaxially oriented film by extrusion of an optically anisotropic dope of PPTA through a ring die onto a conical mandrel coated with oil. However, this film is low in isotropic mechanical strength and, when draft is applied, although the mechanical strength in MD direction is high, that in TD direction is markedly low.

Japanese Patent Publication No. 51248/1980 discloses a film of a polyamide hydrazide copolymer and, while stating clearly that "the content of p-phenyleneterephthalamide units is desirably 40 mol % or lower", describes about a preparation example of a film from an optically isotropic dope containing 5% PPTA as Reference preparation example. The PPTA film disclosed in this reference is low in transparency (namely having small light transmittance), and also has the drawback of containing a large number of voids.

Japanese Patent Publication No. 44957/1978 also discloses a film of a polyamide hydrazide polymer. However, the PPTA film disclosed in this reference, since it is obtained by "instantly" coagulating the dope after a dope exhibiting optical anisotropy is casted, the liquid crystal domain inherent in the optically anisotropic dope remains in the film, whereby the film is opaque and lacking toughness.

Japanese Patent Publication No. 17886/1982 discloses a film transparent and isotropic in mechanical properties, which is prepared by heating an optically anisotropic dope of a liniarly para-oriented aromatic polyamide immediately before coagulation until it becomes optically isotropic, followed by coagulation. This method is original as opposed to the general technical thought of attempting to obtain high performance by utilization of optically anisotropic dope of the prior art, and is successful in alleviating the extreme monoaxial orientation of an optically anisotropic dope and at the same time avoiding the phenomenon that the liquid crystal domain structure of the optically anisotropic dope remains after extrusion and coagulated as such to give an opaque film. However, this method also cannot but use an inorganic strong acid such as sulfuric acid or others as the solvent for PPTA, and also depends on heating as the means for making the dope optically isotropic, and therefore during heating to a temperature before the optically anisotropic dope becomes optically isotropic, decomposition of the polymer cannot be avoided, whereby the problem is involved in obtaining a film of high elongation. Also, only by extrusion of the dope after making it optically isotropic by heating, while the flowing orientation during extrusion can be alleviated as compared with the case of an optically anisotropic dope, the dope becomes very highly viscous, and the very extrusion itself becomes difficult. In fact, the PPTA film disclosed in Example 1 of Japanese Patent Publication No. 17886/1982 has small elongation and the film is transparent but it is not satisfactory with respect the degree of transparency (light transmittance) or flatness of the film, partially because drying step is conducted under no tension.

Further, Japanese Patent Publication No. 17886/1982 discloses preparation of a film transparent and isotropic in mechanical properties by a process comprising heating a solution of a liniarly para-oriented aromatic polyamide immediately before coagulation to a temperature at which said dope becomes optically isotropic, followed by coagulation. However, this film is still lacking mechanical properties, particularly the modulus as required by base film for use in magnetic tape.

In order to obtain mechanical properties in monoaxial direction, heat streching in that direction is generally practiced. However, generally speaking, a liniarly para-oriented aromatic polyamide is deficient in thermoplasticity and particularly a liniarly para-oriented polyamide is readily crystalized, indicating an unclear glass transition temperature, and therefore further heat streching after film formation is almost impossible, whereby it is very difficult to improve the physical properties of the film by heat streching. The film obtained according to the process as mensioned above (the process of Japanese Patent Publication No. 17886/1982) can be heat streched with difficulty.

As described above, since an optically anisotropic dope has a domain structure in which the polymers are gathered as liquid crystals, its domain structure remains when the dope is formed into a film and the resultant film becomes opaque. If an optically isotropic dope is used for avoiding this phenomenon, a useful PPTA of high molecular weight becomes very highly viscous to make film fabrication impossible unless at a polymer concentration of about 5 weight % or lower, and the film prepared from an optically isotropic dope of such a concentration is liable to form void during coagulation and is also entirely unsatisfactory with respect to mechanical properties.

BRIEF DESCRIPTION OF THE DRAWING

FIG. 1 shows the incident direction of X-ray in determining the crystal orientation angle of a PPTA film.

FIG. 2 shows a schematic diagram of a fringe pattern observed when a highly oriented PPTA film produced according to the prior art technique is observed by a polarizing microscope.

SUMMARY OF THE INVENTION

An object of the present invention is to provide a film by use of PPTA, which is excellent in transparancy as described above and sufficiently oriented not only in the MD direction but also in the TD direction of the film, having high strength, elongation, modulus and dimensional stability in both longitudinal and lateral directions, and is also excellent in flatness, and also an industrial process for producing the same.

Another object of the present invention is to provide a PPTA film having sufficient mechanical strength and modulus in monoaxial direction, and high strength, high modulus and high dimensional stability not realized in the film of prior art and also a process for producing industrially the same.

According to the present invention, in one aspect, there is provided a film consisting substantially of a poly-p-phenyleneterephthalamide having an inherent viscosity $\eta$inh of 2.5 dl/g or higher, having the following specific features A to F:

A. its density is 1.365 g/cm$^3$ to 1.405 g/cm$^3$;
B. its void number is 5/mm$^2$ or less;
C. its light transmittance is 55 % or higher;
D. the crystal orientation angle in the direction at which the diffraction intensity on the (200) plane by the X-ray incident at right angle on the film surface is 30° or more;
E. the crystal orientation angle on the (010) plane by the X-ray incident in pallarel to the film surface is 60° or less; and
F. the elongation at break in the longer direction is 9% or higher Such a film can be produced according to another aspect of the present invention, namely a process for producing a poly-p-phenyleneterephthalamide film, which comprises forming an optically anisotropic dope containing a poly-p-phenyleneterephthalamide having an inherent viscosity $\eta$inh of 2.5 dl/g or higher and at least one solvent selected from the group consisting of sulfuric acid, chlorosulfuric acid and fluorosulfuric acid into a film while maintaining its optical anisotropy, placing said film-shaped dope under an atmosphere of either (A) or (B) shown below:

A. in a gas of an absolute humidity of 3 g (water)/Kg (dry air) or higher and a relative humidity of 99% or lower;
B. in a gas of 45° C. or higher containing water in the form of saturated steam, super-saturated steam or mist, thereby to convert substantially said film-shaped dope to optically isotropic, then coagulating the dope, subsequently washing the coagulated product and drying the washed product while restricting shrinkage.

In such a production process, it is also possible to employ a method as desired in which the wet film obtained by coagulation and washing containing substantially no solvent and containing 50 parts by weight or more of water per 100 parts by weight of the polymer is stretched to 1.05 to 2.5-fold in monoaxial direction, followed by drying.

DESCRIPTION OF THE PREFERRED EMBODIMENT

The technical thought taught in Japanese Patent Publication No. 17886/1982 as mensioned previously, while using a dope with the high polymer concentration which is preferable for enhancing the mechanical properties of a film, applies lowered viscosity of the dope accompanied with the liquid crystal phenomenon formed naturally by PPTA for making dissolution, conveying or molding of the polymer more easily, and takes the step of heating the dope only within a short time immediately before the final coagulation to make the dope optically isotropic, thereby obtaining a transparent film. The present inventors have made intensive investigations on the application of this technical thought and overcoming of its problems and consequently happend to discover a phenomenon. That is, it has been found that a cast optically anisotropic dope can be subjected to moisture absorption or water absorption in combination with heating, whereby it can be converted to an optically isotropic dope very efficiently as compared with the method only by heating. The film thus obtained was also found to be less in lowering of polymerization degree, greater in elongation at break, improved in transparency and also transparency and flatness of the film could be improved to great extent by drying the film while restricting its shrinkage. Further, it has been found that the wet fabricated film can be stretched to a degree higher than is expected in a special step of the production steps and a film having high mechanical properties in the stretched direction paticularly high modulus, can be obtained without fibrilation which is ruptured with difficulty in both stretched and perpendicular directions. Thus, the present invention has been accomplished on the basis of an expected fact that a high crystal orientation degree can be accomplished by such a method to give high strength and high modulus in one direction, while giving also satisfactory practical physical properties in the direction perpendicular thereto without fibrilation, and yet causing no bursting in one direction.

More specifically, the first invention is a film consisting substantially of a poly-p-phenylene terephthalamide having an inherent viscosity $\eta$inh of 2.5 dl/g or higher, having the following specific features A to F:

A. its density is 1.365 g/cm$^3$ to 1.405 g/cm$^3$;
B. its void number is 5/mm$^2$ or less;
C. its light transmittance is 55% or higher;
D. The crystal orientation angle in the direction at which the diffraction intensity on the (200) plane by the X-ray incident at right angle on the film surface is 30° or more;
E. The crystal orientation angle on the (010) plane by the X-ray incident in pallarel to the film surface is 60° or less; and
F. the elongation at break in the longer direction is 9% or higher, and such a film can be produced according to the second invention namely a process for producing a poly-p-phenyleneterephthalamide film, which comprises forming an optically anisotropic dope containing a poly-p-phenyleneterephthalamide having an inherent viscosity $\eta$inh of 2.5 dl/g or higher and at least on solvent selected from the group consisting of sulfuric acid, chlorosulfuric acid and fluorosulfuric acid into a film while maintaining its optical anisotropy, placing said film-shaped dope under an atomsphere of either (A) or (B) shown below:

A. in a gas of an absolute humidity of 3 g (water)/Kg (dry air) or higher and a relative humidity of 99% or lower;
B. in a gas of 45° C. or higher containing in water in the form of saturated steam, super-saturated steam or mist, thereby to convert substantially said film-shaped dope to optically isotropic, then coagulating the dope, subsequently washing the coagulated product and drying the washed product while restricting shrinkage.

In such a production process, if necessary, it is possible to stretch the wet film obtained by coagulation and then washing, containing substantially no solvent and containing 50 parts by weight or more of water per 100 parts by weight of the polymer, to 1.05 to 2.5-fold in monoaxial direction, followed by drying.

The film of the present invention consists substantially of PPTA represented by the formula:

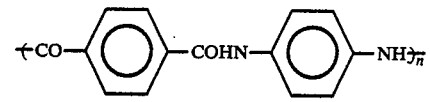

Here the term "Substantially" means that it is permissible to contain a small amount of components other than PPTA which does not interfere with the requirements and the effect of the present invention. For example, a polymer [e.g. poly-(m-phenyleneterephthalamide), poly-(p-phenyleneisophthalamide), poly-(m-phenyleneisophthalphenyleneisophthalamide), amide), poly-(methyleneterephthalamide), aliphatic polyamide, polyether, polyimide, polyurethane, polyurea, etc.]may be blended or recurring units (e.g. nucleussubstituted p-phenylene units, nucleus-substituted or unsubstituted biphenylene units, o-phenylene units, m-phenylene units, (poly) methylene units, pyridilene units or bonding units such as ester, urethane, urea, ether, thioether, etc.) may be copolymerized with PPTA.

The PPTA to be used in the present invention can be conveniently produced from p-phenylenediamine and terephthaloyl chloride according to low temperature solution polymerization.

The polymer of the present invention may have a polymerization degree which can give generally an inherent viscosity $\eta$inh (a value measured at 30° C. by dissolving 0.2 g of a polymer in 100 ml of sulfuric acid) of 2.5 dl/g or higher, preferably 3.5 dl/g or higher, because no film with good mechanical properties intended by the present invention can be obtained if the polymerization degree is too low.

The film of the present invention can accomplish its objects for the first time by satifying the six features A to F as described below.

The first feature A is that said film must have a density in the range of from 1.365 g/cm$^3$ to 1.405 g/cm$^3$. This density value is measured according to the density gradient pipe method by use of carbon tetrachloride-toluene at 30° C. This range of density is considerably smaller as compared with the range of that of known PPTA fibers which is from 1.43 g/cm$^3$ to 1.46 g/cm$^3$. The reason is not clear, but, it may be considered that microvoids may be formed between the molecules probably because of the plane orientation as compared with the monoaxially oriented fiber. If the density becomes less than 1.365 g/cm$^3$, mechanical properties will be lowered, while a film impaired in plane orientation will be obtained if it exceeds 1.405 g/cm$^3$ (for example, the film disclosed in U.S. Pat. No. 3,869,429). Anyway, on account of such a small density, a light and high strength film can be obtained.

The second feature B is that the void number as described below must be 5/mm$^2$ or less. The void number is measured as follows. A film strip with an appropriate size is observed by a conventional optical microscope using transmitted light at a magnification within the range of from 100-fold to 400-fold for at least five different fields of vision and the number of voids with its longer length of 30 μm or longer is counted and calculated per 1 mm$^2$ of the film surface. The film having a void number over 5/mm$^2$ is inferior in mechanical properties, lowered in transparency and the film appears cloudy in an extreme case. In this connection, in the films made from conventional optically isotropic dopes (for example, PPTA films are disclosed in Japanese Laid-open Patent Publication No. 132674/1979 or Japanese Patent Publication No. 51248/1980), a void number of 50/mm$^2$ or more is generally observed. Preferably, the void number should be 3/mm$^2$ or less.

The third feature C is that the light transmittance of the film must be 55% or higher. The light transmittance is measured as follows. A film is plastered on the place where a liquid cell is to be set and a conventional photoelectric photometer (or spectrophotometer) and a visible light with wavelenghth of 600 nm is selected and its transmittance is measured. One of the important specific features of the film according to the present invention resides in this transparency. In this connection, the film obtained by direct coagulation of the optically anisotropic dope as described above into a coagulation bath through a slight air gap (for example, the PPTA film disclosed in U.S. Pat. No. 3,767,756) is devitrified, and has generally a light transmittance of 10% or lower. Also, Japanese Patent Publication No. 17886/1982 discloses a transparent PPTA film, but the PPTA film disclosed in the example of said publication has a light transmittance of about 40% in terms of the light transmittance as defined by the present invention, because the optically anisotropic dope is converted to the optically isotropic dope only by heating and drying is conducted under no tension. Thus, it can be distinguished from the film of the present invention having a light transmittance of 55% or higher. Further, PPTA films as described in Japanese Patent Publication Nos. 35088/1982, 5407/1984, 44957/1978 and J. Appl. Polym. Sci., Vol. 27, No. 8, P. 2965-2985 (1982) are produced by coagulation of the optically anisotropic dopes as such namely without conversion to optically isotropic dopes, and therefore they are markedly inferior in transparency and have a light transmittance as defined in the present invention of about 20% or lower. On the other hand, the PPTA films disclosed in Japanese Patent Publication No. 51248/1980 and Japanese Laid-open Patent Publication No. 132674/1979 are obtained by direct coagulation of optically isotropic films and therefore voids are liable to be generated abunduntly on the film as described above. Thus, even transparent films are consequently found to have a light transmittance of less than 55%. Also, the PPTA film disclosed in J. Appl. Polym. Sci., Vol. 23, P. 915 (1979) is obtained by direct coagulation of an optically isotropic or optically anisotropic dope, and therefore it is different from the film of the present invention in the above point. The film of the present invention has preferably a light transmittance of 65% or higher. The light transmittance is of course lowered as the thickness of the film is increased, but the film according to the present invention has a transparency well over 55% to a thickness of about 200 μm which is conventionally used The excellent transparency posessed by this film is believed to be related also to the good smoothness and flatness on the film surface.

Further, the film of the present invention must have the plane orientation characteristics as defined by the crystal orientation angles by X-ray diffraction. That is, the feature D is that the crystal orientation angle on the (200) plane by the X-ray incident at right angle on the film surface must be 30° or higher, and the feature E is that the crystal orientation angle on the (010) plane by the X-ray incident in pallarel to the film surface must be 60° or lower Incidence of X-ray may be classified into the case when it enters the film at the right angle on the film surface (hereinafter called TV direction) and the case when it enters the film in pallarel to the surface (hereinafter called SV direction) as shown in FIG. 1. The crystal structure of PPTA has been widely discussed and there is, for example, the study by Takayanagi et al (J. Appl. Polym. Sci., Vol. 23, P. 915 (1979)].

The film of the present invention has a great diffraction peak at $2\theta \approx 23°$ which is the reflection by X-ray in the TV direction against the (200) plane and the crystal orientation angle at this $2\theta \approx 23°$ is required to be 30° or higher Further, there appears a great diffraction peak on the equatorial line at $2\theta \approx 18°$ which is the reflection by incidence in the SV direction against (010) plane, and the crystal orientation angle at this $2\theta \approx 18$ is required to be 60° or lower For the first time when both of these crystal orientation angles are satisfied, the film of the present invention may be said to have a plane oriented structure, while the film having crystal orientation angles outside of this range cannot be said to have plane oriented characteristics and therefore no film having high mechanical properties in both MD direction and TD direction intended by the present invention cannot be obtained.

As the method for measuring crystal orientation angles, a known method can be employed and, for example, the following method can be employed. By placing a counter at the desired angle of $2\theta$ and rotating the film by 180°, a diffraction intensity curve can be obtained. In TV, rotation is effected around the maximum intensity at the center by 90° before and after the center. A value represented by the arc length in terms of degree in the diffraction photograph corresponding to the point indicating the half strength for the base line drawn between the points of the maximum intensity and the minimum intensity on this curve (namely, the angle corresponding to the point of 50% of the maximum intensity based on base line) is measured and it is defined as the crystal orientation angle of the sample. During measurment, diffraction intensity can be measured with some sheets of films superposed on one another if necessary.

The films of the present invention can be classified into the two types according to the crystal orientation angle at the (200) plane by the X-ray incident at right angle on the film surface. That is, the first type is one having the orientation angle of about 70° or higher, which appears substantially as Debye ring in the diffraction photograph, and has the properties which are substantially equal in MD direction and TD direction. Such a film can be obtained when it was not substantially stretched or biaxially stretched uniformly in the manufacturing step.

On the other hand, when a wet film is stretched in monoaxial direction to 1.05 to 2.5-fold in preparation of the film, the crystal orientation angle in the direction at which the diffraction strength on the (200) plane by the X-ray incident at right angle on the film surface becomes maximum is 30° to 70°, and this film is highly oriented monoaxially and has high strength and modulus in that direction. A film with this orientation angle of less than 30° (for example, PPTA film of U.S. Pat. No. 3,869,429) is not desirable, because it is easily bursted or fibrilated in the monoaxial direction.

When the cross-section of the bursted film of the present invention was observed by a scanning type electron microscope, a laminar structure in pallarel to the film surface was observed. This may be regarded as one of the fact supporting the plane oriented structure of the film of the present invention.

Further, it is critically required as the feature F that the film of the present invention should have an elongation at break of 9% or higher in the MD direction. Elongation at break is measured by drawing stress-strain curves for five sheets of film samples cut in rectangular shapes of 100×10 mm by means of a constant speed elongation type stress-strain measuring machine with an initial grip length of 30 mm and a drawing speed at 30 mm/minute and calculating therefrom.

The film of the present invention is very tough, because it has a great elongation at break of 9% or more in the MD direction, while the most of the PPTA films disclosed in the prior art literatures have only elongation at break less than 9%. Examples of the PPTA films having such low elongation include the PPTA films as disclosed in examples of Japanese Patent Publication Nos. 5407/1984, 35088/1982 and 17886/1982 and U.S. Pat. No. 3,869,429.

The film of the present invention has preferably an elongation at break of 9% or more also in the TD direction. Another prefered enbodiment of the film of the present invention has an elongation at break of 15% or more in the MD direction.

In the film of the present invention, it is preferred that no dense fringe pattern is observed when it is observed by a polarizing microscope.

Here, it would be benificial for better understanding of the present invention to describe about the structure of the PPTA film. When the optically anisotropic dope as described about is molded into a film by merely extruding through a slit, a dense fringe pattern as shown in FIG. 2 can be seen by observation of this film with the polarizing microscope under crossed Nicols (about 100 to 1000 magnification). Such a fringe pattern can be seen, when the Kevlar ®, which is prepared according to the known method (e.g. the method of U.S. Pat. No. 3,767,756) and is already commercially sold, is observed by the same polarizing microscope. This is estimated to be related to the so called pleated sheet structure proposed by Dobb [J. Polym. Sci. Polym. Phys., Vol. 15, P. 2201 (1977)].

This fringe pattern, as described above, is considered to be related to the agglomarated structure in shape of a pleated sheet. The fringe pattern can be recognized also by a conventional optical microscope, but it can be observed more clearly as a fringe having various colours as shown in FIG. 2 when observed by use of a polarizing microscope under crossed Nicols or under the state approximate to the closed Nicols. The magnification in a polarizing microscope may be sufficiently 100 to 1000-fold as conventionally used. During observation, a conventional contrivance such as use of a immersion liquid such as olive oil or methylene iodide may be applied It is difficult to quantitate the interval between fringe only by the observation by a polarizing microscope. Thus, "dense fringe pattern" means the interval to the extent that it can be confirmed with the magnification conventionally used in a polarizing microscope. As described above, the film obtained by merely extruding an optically anisotropic dope through a slit and coagulating it immediately (e.g. the film of U.S. Pat. No. 3,869,429) has usually a fringe pattern with intervals of 0.1 to 0.4 μm or less, and the film is bursted in the direction perpendicular to the fringe pattern, and is easily fibrilated.

As an embodiment of the film of the present invention, there is also included a film highly oriented in monoaxial direction (which is characterized by 30° to 70° of the crystal orientation angle in the direction at which the diffraction intensity at (200) plane by the X-ray incident at right angle on the film surface becomes maximum). Such a film, in spite of having monoaxial orientation, has no such fringe pattern as observed in the highly oriented PPTA film disclosed in U.S. Pat. No. 3,869,429 and therefore it has excellent characteristics of high strength and high modulus without being bursted in one direction and being fibrilated with difficulty.

Next, a process for obtaining such a PPTA type film is to be described.

The polymer to be used for production of a film may have a polymerization degree, which is selected so as to give an inherent viscosity ηinh (a value measured at 30° C. by dissolving, 2 g of a polymer in 100 ml of sulfuric acid) of 2.5 or more, preferably 3.5 or more, because no film with good mechanical properties intended by the present invention cannot be obtained if the polymerization degree is too low.

The solvent suitable for preparation of the dope for molding of the polyamide film of the present invention is sulfuric acid, chlorosulfuric acid, fluorosulfuric acid or a mixture with a concentration of 98% by weight or more. Sulfuric acid may have a concentration of 100% or more, namely fuming sulfuric acid, and it is also possible to use a trihaloacetic acid mixed in the solvent within the range which does not impair the effect of the present invention.

The polymer concentration in the dope to be used in the present invention may preferably be a concentration which exibits optical anisotropy at around room temperature (about 20° to 30° C.) or higher, specifically about 10% by weight or more, preferably about 12 weight % or more. At the polymer concentration which does not exhibit optical anisotropy at a room temperature, the PPTA film molded will frequently has no desirable mechanical properties or contains much voids. The upper limit of the polymer concentration of the dope is not particularly limited but it is generally 25% by weight or less, preferably 20% by weight for a PPTA type polymer with a particularly high ηinh.

In the dope of the present invention, there may be also incorporated common aditives such as extenders, matting agents, UV-ray stabilizers, thermal stabilizers, antioxidants, pigments, dissolution aids and others.

It can be examined according to the known method, for example, the method disclosed in Japanese Patent Publication No. 8474/1975 whether the dope is optically anisotropic or isotropic. However, since its critical point depends on the solvent used, the temperature, the polymer concentration, the polymerization degree of the polymer, the content of the non-solvent, etc., an optical anisotropic dope can be prepared by previously examining the relationships between these factors, and also it is possible to change optical anisotropy to optical isotropy by changing the conditions to those for optically isotropic dope.

The process for obtaining the transparent film having excellent mechanical properties of the present invention comprises forming the dope into a film-shaped dope on a support surface and then converting the dope from optically anisotropic state to optically isotropic state by subjecting the dope to water absorption before coagulation.

Conversion from optically anisotropic state to optically isotropic state can be accomplished specifically by subjecting the optically anisotropic dope formed into a film-shaped dope on the support surface to absorp moisture prior to coagulation thereby to lower the concentration of the solvent forming the dope to be transferred to the optically isotropic region through the changes in dissolving ability of the solvent and the polymer concentration, or alternatively by heating in addition to the changes in the optically anisotropic region of the dope by moisture absorption thereby to elevate the dope temperature, to transfer at the same time or successively the phase of the dope to optically isotropic state.

Moisture absorption of the dope can be accomplished according to the method (A) wherein moisture absorption is effected in an atomosphere of an absolute humidity of 3 g (water)/Kg (dry air) or higher and a relative humidity of 99% or less or the method (B) wherein moisture absorption is effected in a gas of 45° C. or higher containing water in the form of saturated steam, super-saturated steam or mist.

In the method (A), at an absolute humidity less than 3 g (water)/Kg (dry air), moisture absorption rate is unpractically slow. Particularly, in the case of making the optically anisotropic dope into optically isotropic dope, the absolute humidity should preferably be 10 g (water)/Kg (dry air) or higher, more preferably 20 g (water)/Kg (dry air) or higher. Also, a contrivance of applying positively humidifying on the usual humidity atomosphere is a desirable embodiment for shortning the time before change into optically isotropic state or, in the case of employing heating in combination, lowering the heating temperature. If the relative humidity exceeds 99% water will be condensed on the dope at the low temperature lower than 45° C., whereby the polymer may be disadvantageously precipitated or the film may lose its flatness. On the other hand, in the method in which heating is used in combination simultaneously with or after moisture absorption, the temperature at which the dope is converted to optically isotropic state with substantial extinction of optical anisotropy by use of, for example, sulfuric acid and the solvent, which may differ depending on the polymer concentration, the polymerization degree of the polymer, the sulfuric acid concentration, the thickness of the dope and the further the extent of moisture absorption, may be generally preferred to be about 45° C. or higher, and its upper limit should desirably be not too high in view of the decomposability of the polymer, preferably be selected such that the temperature of the film-shaped dope may not exceed 200° C., preferably 150° C. Most preferably, water absorption should be effected in an air at a temperature of 45° C. or higher with a relative humidity of 80% or higher.

In the method (B), water in the form of mist means particles of water which can be floated in the air, of the agglomerated water formed by releasing steam of 100° C. or higher into the air, or fine particles of water as generated by a commercially available humidifier, and large particles of water not capable of floating in the air are excluded. For, if large particles of water contact the dope on the support surface, partial coagulation will undesirably be initiated. The temperature employed may generally be 45° C. or higher. If moisture absorption is effected at a temperature lower than 45° C. with a gas containing saturated or supersaturated steam, partial coagulation occurs to cause undesirably precipitation of the polymer or loss of the flatness of the film. Its upper limit should desirably be generally not too high in veiw of the decomposability of the polymer, and it is desirable that the temperature of the film-shaped dope should not exceed 200° C. The more preferable range of the temperature for moisture absorption of the dope is 60° to 150° C.

In the process of the present invention air is most economically preferred as the gas.

Thus, it is an important specific feature of the production process of the present invention to effect moisture absorption in converting the optically anisotropic dope of PPTA to optically isotropic dope. By doing so, a film which is great in both strength and elongation can be produced industrialy with ease and without damaging the properties of the film. Particularly, the method (B), in which the dope is subjected to water absorption with an air containing a large amount of water at high temperature, can convert the optically anisotropic dope of the PPTA type polymer to optically isotropic dope within a short time of several seconds or less, whereby isotropic films extremely excellent in transparancy and great in both strength and elongation can be produced industrially easily and without damaging the properties of the film, even in the case when the thickness of the dope is thick, when the polymer concentration in the dope is high or when the polymerization degree of the polymer is large.

The mechanism in which optical isotropic change occurs by water absorption is not clear, but it may be considered to be probably due to slight lowering in polymer concentration and lowering in solvent concentration to a great extent caused by moisture absorption (for example, in the case of sulfuric acid, 98 or more concentration charged is estimated to be lowered by water absorption to about 85 to 95%), whereby rigidity of the molecular chains of PPTA is reduced thereby to result in considerably shrinkage of the liquid crystal region of the PPTA-solvent system. When the polymer concentration is small, while sufficient optical isotropic change occurs only by this moisture absorption, isotropic change within a short time becomes possible when this is further accompanied with heating. This method is particularly effective when the thickness of the dope is thick or when the polymer concentration is great.

If the optical isotropic change is attempted to be effected only by heating without moisture absorption (for example, Japanese Patent Publication No. 17886/1982), high temperature and long time heating is required, and the film obtained is accompanied with partial decomposition of the polymer, whereby light transmittance and mechanical properties tend to be inferior.

In carrying out the wet system molding of the film according to the process of the present invention, it is not necessary to use a special film preparation method, but there may be employed the method in which the dope is uniformly casted on a glass plate or metal plate, followed by placing into a coagulation bath to form film, the method in which a rotary drum of which whole or more than half is immersed in a coagulation bath is employed, the method in which the dope in shape of a film is led from a die into a coagulation bath, or the method in which a dope stream exitting from the die is permitted to flow down simultaneously with a coagulation liquid to form a film.

In the present invention, the coagulating liquid which can be used for coagulation of the dope may include, for example, water, dil. sulfuric acid of about 70% by weight or less, aqueous sodium hydroxide and anmonia water of about 20% by weight or less, aqueous sodium chloride and aqueous calcium chloride of about 50% by weight or less. The temperature of the coagulation bath is not particularly limited, but it may be generally within the range of from about $-5°$ to $50°$ C.

The film coagulated contains an acid as such, and therefore it is necessary to wash and remove the acid component as far as possible in order to produce a film with little lowering in mechanical properties by heating. Removal of the acid component is conducted generally to a content of about 5000 ppm or less, preferably about 500 ppm or less. Water is generally used as the washing liquid, but it is also possible to use hot water or wash the film by neutralization with an aquous alkali before washing with water. Washing may be performed by running the film through a washing liquid or by spraying a washing liquid on the film.

The washed film may be optionally subjected to stretching in monoaxial direction. That is, when a film excellent particularly in mechanical properties in monoaxial direction is desired to be obtained, the coagulated film, after removal of the solvent with water washing and before drying, is subjected to monoaxial stretching under the swelled state containing substantially no solvent but containing water, namely a so called wet stretching.

The water content in the film after coagulation and water washing, which depends generally on the polymer concentration in the dope under temperature of the coagulation bath, is 50 parts by weight or more per 100 parts by weight of the polymer. If it is less than 50 parts by weight, the stretching degree cannot be increased, and if stretching may be effected at an increased stretching degree, a considerable extent of high orientation and crystalization will occur, whereby the dried film is undesirably susceptible to fibrilation and bursting in the stretched direction and the perpendicular direction. The upper limit of water content is not particularly limited but attached water other than in swelling may be also be present on the film surface.

The stretching degree in wet stretching of the present invention may preferably be 1.05-fold or more, more preferably 1.2-fold or more in order to extract the mechanical strength of the film after drying effectively. On the other hand, the maximum stretching degree should preferably be 2.5-fold or less, because stretching to 2.5-fold or more will result in cutting in most cases, and also because the film becomes weaker in the mechanical strength in the direction perpendicular to the stretched direction to be suseptible to bursting and fibrilation, although the mechanical strength in the stretched direction can be increased as the stretching degree is higher. If the film is streched to more than 2.5-fold, the crystal orientation angle in the stretched direction becomes too small (namely less than 30°), whereby not only the mechanical strength in the direction perpendicular to the stretched direction becomes weak and suseptible to bursting but also fibrilation will readily occur. Therefore a stretching degree of 2.5-fold or less is preferred. On the contrary, if the stretching degree is less than 1.05-fold, no effect of stretching can be recognized, but the crystal orientation angle in the direction where the diffraction intensity at the (200) plane by the X-ray incident at right angle on the film surface becomes maximum is greater than 70°, similarly as the film which has not been stretched, and the mechanical properties and others are approximately isotropic. The temperature during stretching may be a temperature which can hold water, and stretching may be conducted either in the air or in a water bath or a hot water bath. No special method is required to be used for stretching, but there may be employed a method in which the circumference velocity difference of the rolls or a tenter is utilized.

The washed film, as such or after optionally stretched, is then dried. Here, drying means the operation to remove washing liquid, etc., attached on the film. For example, there may be employed any of air drying at room temperature, drying under an atomosphere of an inert gas such as air, nitrogen, argon, etc., drying on heated rolls, drying under a heated atomosphere by a tenter, and others. Also, drying is generally required to be performed while restricting shrinkage of the film under tension or under constant length in order to prevent the film from formation of wrinkles or maintain the flatness of the film.

The drying temperature is not particularly limited, but, in order to make the mechanical strength effective, higher temperature is preferred and a temperature of 100° C. or higher, more preferably 200° C. higher, is employed. The maximum temperature for drying is not particularly limited but in view of drying energy or decomposability of the polymer a temperature of 500° C. or lower is preferred.

In producing the film according to the process of the present invention, each of the above steps may be either batchwise or continuous, and it is also one of the preferred embodiments to produce a film while permitting the film to run continuously through all the steps. Also, in any desired step, an oil agent, or a dye for discrimination can be imparted to the film.

The film of the present invention has good mechanical properties as represented by high strength and high modulus not found in commercially available films, as shown in the following examples, and yet also exibiting (1) very well-balanced physical properties in the MD direction and the TD direction or (2) dramatically good mechanical properties, particularly strength at break and modulus in the stretched direction, while maintaining the mechanical properties in the direction perpendicular to the stretched direction. Also, the film of the present invention is not only markedly excellent in mechanical properties such as tensile strength, modulus, dimensional stability and others, but also, because of having a very dense structure, is useful as filter membranes or packaging materials. Further, it is excellent in chemical resistance and entirely stable to chemical substancies except for strong acids such as sulfuric acid. Further, the film of the present invention can exhibits fully the above good properties when utilized in the field where pressure resistance is demanded, or, due to its particularly excellent electrical properties, when utilized for insulating materials in coating materials of wires for which heat resistance, oil resistance, and electrical characteristics are demanded, or, due to particularly strong mechanical strength, when utilized for insulating materials of electrical instruments rotating at high speed or flexible printed circuits and when used as the magnetic tape by utilizing the particularly high modulus. Further, since the film of the present invention is excellent in transparency which is another specific feature, it is also useful for packaging materials, printing plate materials, photographic films and others. It is one of the important effects of the present invention that such a PPTA film having such excellent properties can be produced according to an industrially utilizable process and without need of using particularly an expensive biaxial stretching machine. The present invention is described by reffering to the following Examples and Reference example (preparation example of PPTA), and these Reference example and Examples are presented for the purpose of illustration and they are not limitative of the present invention. Unless otherwise particularly noted, parts and percent are all by weight. The inherent viscosity $\eta$inh was measured in conventional manner at 30° C. by dissolving 0.2 g of a polymer in 100 ml of 98% sulfuric acid. The viscosity of the dope was measured by means of a B type viscometer at a rotational speed of 1 rpm. The thickness of the film was measured by a dial gauge having a measuring plane with a diameter of 2 mm. Strength, elongation and modulus were measured by drawing load-elongation curves for five sheets of film samples cut in rectangular shapes of 100 mm×10 mm by means of a constant speed elongation type stress-strain measuring machine with an initial grip length of 30 mm and a drawing speed at 30 mm/minute and calculating there from.

Light transmittance is measured as follows. A film is plastered on the place where a liquid cell is to be set in a conventional photoelectric photometer (or spectrophotometer) and a visible light with wavelength of 600 nm is selected and its transmittance is measured, The value of density is measured according to the density gradient pipe method by use of carbon tetrachloride-toluene at 30° C.

Void number is measured as follows. A film strip with an appropriate size is observed by a conventional optical microscope using transmitted light at the magnification within the range of 100-fold to 400-fold at at least five different fields of vision and the number of voids with its longer length of 30 $\mu$m or longer is counted and calculated per 1 mm$^2$ of the film surface.

As the method for measuring crystal orientation angles, the known method can be employed and, for example, the following method can be employed. Incidence of X-ray (CuK$\alpha$-ray) may be classified into the case when it enters the film at the right angle on the film surface (called TV direction) and the case when it enters the film in pallarel to the surface (called SV direction). (see FIG. 1.) The film of the present invention has a great diffraction peak at $2\theta \approx 23°$ which is the reflection by X-ray in the TV direction against the (200) plane, and further there appears a great diffraction peak on the equatorial line at $2\theta \approx 18°$ which is the reflection by incidence in the SV direction against (010) plane. By placing a counter at the desired angle of $2\theta$ and rotating the film by 180°, a diffraction intensity curve can be obtained. In TV, rotation is effected around the maximum intensity at the center by 9020 before and after the center. A value represented by the arc length in terms of degree in the diffraction photograph corresponding to the point indicating the half strength for the base line drawn between the points of the maximum intensity and the minimum intensity on this curve (namely the angle corresponding to the point of 50% of the maximum intensity based on base line) is measured and it is defined as the crystal orientation angle of the sample. During measurment, diffraction intensity can be measured with some sheets of films superposed on one another if necessary. The fringe pattern, if any, can be recognized also by a conventional optical microscope, but it can be observed more clearly as a fringe having various colours when observed by use of a polarizing microscope and the Nicols or under the state approximate to the crossed Nicols.

When the films of all the examples were observed by a polarizing microscope, no dense fringe pattern was observed at all in all the films having a light transmittance of 55% or higher.

REFERENCE EXAMPLE (PREPARATION OF PPTA)

According to the low temperature solution polymerization method, PPTA was prepared as follows. In a polymerizing device as shown in Japanese Patent Publication No. 43986/1978, 70 parts of anhydrous lithium chloride were dissolved in 1000 parts of N-methylpyrrolidone and then 48.6 parts of p-phenylene diamine were dissolved therein. After cooling the solution to 8° C., 91.4 parts of terephthaloyl dichloride were added in the form of powder at one time. Several minutes later, the polymerized reaction product was solidified into a cheese-like state, and the polymerized reaction product was discharged from the polymerizing device according to the method disclosed in Japanese Patent Publication No. 43986/1978, immediately transferred into a biaxial closed type kneader. And the polymerized reaction product was micropulverized in the kneader. Next, the micropulverized product was transferred into a Henschel mixer and about equal amount of water was added, followed further by crushing. The product was filtered, washed several times in hot water and dried in a hot air of 110° C. 95 parts of a pale yellow PPTA polymer having $\eta$inh of 6.5 dl/g were obtained. Polymers with different $\eta$inh can be obtained easily by varying the ratio of N-methylpyrrolidone to the monomers (p-phenylenediamine and terephthaloyl dichloride) and/or the ratio between the monomers.

EXAMPLE 1

A PPTA having an $\eta$inh of 5.0 dl/g was dissolved in 99.7% of sulfuric acid at a polymer concentration of 13.0% to obtain a dope having optical anisotropy at 50° C. This dope was found to have a viscosity at room temperature of 14000 poise. For making film fabrication more easily, this dope was placed in a beaker and maintained at about 70° C. At this time, the dope also exhibited optical anisotropy and had a viscosity of 4000 poise. This dope was applied on a glass plate by an applicator having 0.1 mm stepped difference. Immediately after application a laboratory dish made of glass with a diameter of 15 cm was covered on a part of the dope to be shielded against the moisture in the air. This glass plate was left to stand while being maintained at 60° C. in an air maintained at an absolute humidity of 8.7 g (water)/Kg (dry air).

Two minutes later, the portions other than the portions surrounded by the laboratory dish became transparent, the laboratory dish was removed and the film together with the glass plate was immersed in a water bath at 10° C. The film coagulated by this immersion remained opaque at the portion surrounded by the laboratory dish but other portions were transparent as the results of conversion from anisotropic to isotropic state at the dope stage. The coagulated film was dried in an air oven of 120° C. with its peripheral portions fixed on a frame made of a metal.

Because the film was broken along circumference where the laboratory dish was placed, film fabrication was conducted again and, after coagulation, the opaque portion in the laboratory dish and the transparent portion other than the opaque portion were separated from each other and fixed separately on metal frames to carry out drying in the same manner. The properties of both films are shown in table 1.

13.0% to obtain a dope having optical anisotropy at 60° C. The viscosity of this dope was measured at room temperature to be 14500 poise. For making film fabrication more easily, this dope was maintained at about 70° C. in a tank. Also in this case, the dope had an optical anisotropy and its viscosity was 4200 poise. While maintaining the curved pipe of 1.5 m from the tank via a gear pump to a die at about 70° C., the dope was casted onto a mirror-polished belt made of Hastelloy and exposed to the air at 25° C. ajusted to an absolute humidity of 15.4 g (water)/Kg (dry air) for 200 seconds. After the dope became trasparent, it was coagulated in 3% sulfuric acid at 8° C. After the coagulated film was washed with water of room temperature overnight, constant length drying was conducted in hot air at 200° C. The properties of this film are shown in Table 3.

COMPARATIVE EXAMPLE 2

In example 2, in place of casting the dope onto the belt, the dope was directly coagulated by supplying it through the air layer of 1 cm into 3% sulfuric acid at 8° C. The properties of the film obtained by carring out subsequent treatments similary as example 2 are shown

TABLE 1

| | Thickness (μm) | Density (g/cm³) | Void number (per mm²) | Light transmittance (%) | (200) plane orientation angle | (010) plane orientation angle | Strength at break (Kg/mm²) MD | TD | Elongation at break (%) MD | TD | Modulus (Kg/mm²) MD | TD | ηinh (dl/g) |
|---|---|---|---|---|---|---|---|---|---|---|---|---|---|
| Transparent portion | 22 | 1.398 | 2.3 | 77 | 96° | 44° | 21.1 | 20.2 | 40 | 30 | 457 | 434 | 4.4 |
| Opaque portion | 26 | 1.413 | Unmeasurable without light transmittance | 1.7 | 48° | 49° | 21.8 | 8.3 | 6 | 5 | 476 | 420 | 4.5 |

COMPARATIVE EXAMPLE 1

In order to make the opaque portion surrounded by the labolatory dish in example 1 transparent according to the method disclosed in Japanese Patent Publication No. 17886/1982, after covering of the laboratory dish immediately after application of the dope, the glass plate was heated in an air oven of 130° C. As a result, the opaque portion became gradually transparent 7 minutes later. This was coagulated, washed and dried in the same manner as in Example 1 to obtain a film, which had the properties as shown in Table 2. It can be seen that ηinh is lowered and the film is lowered in strength as the result of partial decomposition of the polymer. That is, as contrasted to the moisture-absorbed site in Example 1 which became transparent at 60° C. for 2 minutes, it took 7 minutes at 130° C. for the site protected from moisture absorption by covering of the laboratory dish to become transparent, and yet the film obtained was inferior in physical properties.

TABLE 2

| Density (g/cm³) | Light transmittance (%) | Strength at break (Kg/mm²) MD | TD | Elongation at break (%) MD | TD | Modulus (Kg/mm²) MD | TD | ηinh (dl/g) |
|---|---|---|---|---|---|---|---|---|
| 1.402 | 66 | 6.4 | 5.5 | 3 | 2 | 440 | 417 | 1.7 |

EXAMPLE 2

PPTA having an ηinh of 5.5 dl/g was dissolved in 99.7% of sulfuric acid at the polymer concentration of in Table 3. This film was found to be entirely opaque with remaining of the domain of liquid crystal, having a very weak strength in the TD direction, to be fibrilated very easily.

EXAMPLE 3

A PPTA having an ηinh of 6.2 dl/g was dissolved in 99.6% of sulfuric acid to a polymer concentration of 14.0% at 60° C. This dope exhibited optical anisotropy at 80° C. and had a viscosity of 3300 poise. This dope was applied on glass plate of 25° C. by an applicator with 0.1 mm stepped difference. Then the dope, which was left to stand in an air of 18° C. maintained at an absolute humidity of 7.5 g (water)/Kg (dry air) for one minute, was sampled and analyzed. As a result, it was found to absorb moisture to the extent that the sulfuric concentration was lowered to 94.4%. However, at this point, the dope remained still opaque and thereafter it was heated to 120° C. for 90 seconds in a dry nitrogen oven, whereby the dope became optically isotropic to be transparent. This dope was coagulated in water of 15° C., subjected to neutralization treatment with 5% aqueous caustic soda solution, followed further by washing with water, to make the acid concentration to 400 ppm. The wet film was dried at constant length at 250° C. for 30 minutes and the properties of the dried film are shown in Table 3.

COMPARATIVE EXAMPLE 3

After the optically anisotropic dope of example 3 was applied similarly on the glass plate, it was directly placed into a dry nitrogen oven of 120° C. and maintained for 90 seconds. This dope, although it did not become optically isotropic, was subjected to coagulation, neutralization, water washing, and drying treatments in the same manner in Example 3. The properties of this film are shown in Table 3.

When the surface of this opaque film was obseved by a scanning type erectron microscope, numberless concavities and convexities of 10 μm to 20 μm units could be seen. This appeare to correspond to one unit of the liquid crystal domain. Thus, this could not be observed at all in a transparent film having cancelled domains.

EXAMPLE 4

A PPTA having an ηinh of 3.4 dl/g was dissolved in 99.5% of sulfuric acid to a polymer concentration of 15.0%. The dope exhibited optical anisotropy at 60° C. and had a viscosity of 2400 poise. While maintaining a curved pipe of 1.5 m from a tank via a gear pump to a die, said optical anisotropy dope was casted from a die having a slit of 0.1 mm×800 mm onto a rotary drum of 1.5 m in diameter with a mirror-polished tantalum lining of which about ⅓ was immersed into water, maintained in an air of 15° C. at an absolute humidity of 6.6 g (water)/Kg (dry air) for 40 seconds, and thereafter passed through a zone in which hot air was blown at 140° C. for 4 seconds, to obtain an optically isotropic transparent dope. However, with the use of hot air of 120° C., the dope did not become transparent. The transparent dope obtained was further coagulated on a rotary drum in water of 5° C. Subsequently, treatment was conducted according to a continuous process comprising the respective steps of water washing, neutralization, and water washing, to make the acid concentration 450 ppm. The wet film was dried at constant lenghth at 300° C. for 20 minutes, and properties of the film obtained are shown in Table 3.

EXAMPLE 5

The same dope as in Example 4 was used, and casted from the same slit die onto the same rotary drum. Then, in passing through the air of the same atomosphere, a box ajusted to an absolute humidity of about 10 g (water)/Kg (dry air) by a commercially available humidifier was provided in the course of the atomosphere, while permitting the dope to run through the zone for 20 seconds, with the speed from the cast point to the hot air zone being 40 seconds similarly as in Example 4, and then the dope was passed through a zone in which hot air of 70° C. was blown for 4 seconds. As a result, an optically isotropic transparent dope was obtained. Subsequent coagulation, water washing and drying steps were conducted in the same manner as in Example 4. The properties of the film obtained are shown in Table 3.

TABLE 3

| | Thickness (μm) | Density (g/cm$^3$) | Void number (per mm$^2$) | Light transmittance (%) | (200) plane orientation angle | (010) plane orientation angle | Strength at break (Kg/mm$^2$) MD | TD | Elongation at break (%) MD | TD | Modulus (Kg/mm$^2$) MD | TD | ηinh (dl/g) |
|---|---|---|---|---|---|---|---|---|---|---|---|---|---|
| Example 2 | 20 | 1.386 | 3.1 | 74 | 89° | 46° | 23.8 | 21.7 | 36 | 41 | 462 | 484 | 5.1 |
| Comparative example 2 | 24 | 1.421 | Unmeasurable | 0.8 | 44° | 41° | 24.9 | 2.5 | 7 | 2 | 503 | 467 | 5.0 |
| Example 3 | 18 | 1.377 | 1.4 | 81 | 84° | 40° | 24.4 | 25.6 | 29 | 21 | 551 | 528 | 5.5 |
| Comparative example 3 | 21 | 1.419 | Unmeasurable | 2.6 | 53° | 48° | 24.1 | 9.4 | 5 | 12 | 512 | 521 | 5.6 |
| Example 4 | 16 | 1.401 | 0.9 | 82 | 82° | 42° | 20.3 | 19.2 | 33 | 38 | 464 | 446 | 2.9 |
| Example 5 | 16 | 1.397 | 1.1 | 76 | 79° | 42° | 21.9 | 19.9 | 31 | 35 | 478 | 441 | 3.1 |

COMPARATIVE EXAMPLE 4

A PPTA having an ηinh of 4.6 dl/g was dissolved in 99.8% sulfuric acid to a polymer concentration of 4.0%. The dope was optically isotropic at 50° C. and had a viscosity of 7100 poise. The dope was casted onto the belt from the die in the same manner in Example 2, exposed to an air ajusted to the same humidity, followed by the same coagulation, washing and drying operations, to obtain a film. The properties of this film which appears to be slightly cloudy are shown in Table 4.

TABLE 4

| Thickness (μm) | Density (g/cm$^3$) | Light transmittance (%) | Void number (per mm$^2$) | Strength of break (Kg/mm$^2$) MD | TD | Modulus (Kg/mm$^2$) MD | TD |
|---|---|---|---|---|---|---|---|
| 30 | 1.362 | 51 | 188 | 5.7 | 6.3 | 392 | 409 |

EXAMPLE 6

This example shows an example in which a film was prepared by making an optically anisotropic dope optically isotropic with a heated air containing mist-like water. The dope of Example 3 was applied onto a glass plate of 120° C. by an applicator with 0.1 mm stepped difference. On the coated dope, an air (about 90° C.) containing mist-like water of normal pressure obtained from a saturated steam of about 3 kg/cm$^2$-G was blown, whereby it was confirmed that the dope became optically isotropic within the time shown in isotropic conversion time in Table 5. Immediately thereafter, the dope was placed together with the glass plate into water of 20° C. to be coagulated therein, subjected to neutralization treatment with 5% aqueous caustic soda and thereafter washed with water over two nights. The wet film was dried at constant length at 250° C. for one hour and the properties of the film obtained are shown in Table 5.

EXAMPLE 7

By use of the same dope as in Example 3, the same procedure of Example 6 was performed on a glass plate of 50° C. The time for becoming optically isotropic and the properties of the film are shown in Table 5.

EXAMPLE 8

After the optically anisotropic dope of Example 3 was applied on the glass plate in the same manner as in Example 6, it was held in the air while maintaining the temperature of the glass plate. At the time shown in the isotropic conversion time in Table 5, the dope became optically isotropic. The temperature and the relative humidity were 32° C. and 76%, respectively. The properties of the film obtained are shown in Table 5.

hot drying machine set at 200° C. The properties of this film are shown in Table 6.

COMPARATIVE EXAMPLE 5

The dope prepared in Example 9 was formed into a film by an applicator with 0.1 mm stepped difference on a glass plate of 200 mm square maintained at 110° C. in a box under a nitrogen atomosphere subjected to −40° C. dew point drying.

40 seconds later, the dope on the glass retained optical anisotropy, and the dope was taken out together with the glass plate from the dry box and immediately placed into water of 20° C. to be coagulated. The film obtained was opaque, washed in the same manner as Example 9 and stretched in the MD direction. Most of the films were cut, and some films could be stretched to

TABLE 5

| | Time for becoming isotropic (sec) | Thickness (μm) | Density (g/cm³) | Light transmittance (%) | Strength at break (Kg/mm²) | | Elongation at break (%) | | Modulus (Kg/mm²) | | ηinh (dl/g) | Void number (per mm²) | Streak pattern | (200) plane orientation angle (°) | (010) plane orientation angle (°) |
|---|---|---|---|---|---|---|---|---|---|---|---|---|---|---|---|
| | | | | | MD | TD | MD | TD | MD | TD | | | | | |
| Example 6 | 3 | 20 | 1.378 | 79 | 25.3 | 27.2 | 19 | 22 | 655 | 680 | 5.6 | 1.8 | None | 91 | 43 |
| Example 7 | 5 | 19 | 1.382 | 78 | 23.8 | 24.5 | 30 | 43 | 840 | 708 | 5.2 | 1.1 | None | 86 | 39 |
| Example 8 | 60 | 23 | 1.380 | 76 | 20.6 | 22.5 | 17 | 18 | 496 | 515 | 5.4 | 1.3 | None | 92 | 45 |

EXAMPLE 9

A PPTA polymer having an ηinh of 5.5 dl/g was dissolved in 99.7% sulfuric acid to a polymer concentration of 13.0% to obtain a dope having optical anisotropy at 60° C. The viscosity of this dope was measured at room temperature to be 14500 poise. For making film fabrication more easily, this dope was placed in a tank and maintained at about 70° C. At this time, the dope also had optical anisotropy similarly as above, and had a viscosity of 4200 poise. While maintaining a curved pipe of 1.5 m from the tank via a gear pump to a die, the dope was casted from a die having a 0.2 mm×300 mm slit onto a mirror-polished belt made of Hastelloy maintained at 110° C., and maintained in an atomosphere of 20° C. and a relative humidity of 68% for 40 seconds, followed by coagulation to prepare a film continuously. When the dope was sampled from the belt immediately before coagulation in the course of film preparation, it was found to be optically isotropic with a considerably high viscosity.

The coagulated film was taken out, washed with water of room temperature overnight and subjected to measurement of water content. As a result, 350 parts by weight of water were contained per 100 parts by weight of the polymer.

The film containing water was put in between the chucks with a 100 mm width of a constant speed elongation type stress-strain measuring machine and, elongated to 1.5-fold in the MD direction and, under such a state, constant length drying was conducted by blowing hot water of 200° C. thereagainst. The properties of this film are shown in Table 6. It was not observed that this film was bursted in the stretched direction.

EXAMPLE 10

In Example 9, the film containing water after water washing was not stretched and constant length drying was conducted in the same manner as in Example 9 in a 1.2-fold but they were broken on drying. Accordingly, the films washed with water were not stretched and subjected to constant length drying in a hot air of 100° C. The properties of this film are shown in Table 6.

COMPARATIVE EXAMPLE 6

This example shows an example in which the dope of Example 9 was coagulated according to the process of U.S. Pat. No. 3,767,756.

In Example 9, at 5 cm directly below the die, a coagulation bath holding water of 25° C. was placed, and the dope was extruded through the die, once passed through an area, led into the coagulation bath and wound up continuously at a speed which is 3-fold of the discharging speed of the dope.

The coagulated film was taken out, washed with water of room temperature overnight and the water content was measured. As a result, 280 parts by weight of water were found to be contained per 100 parts by weight of the polymer. When the film containing water was attempted to be stretched in the MD direction according to the same method in Example 9, no stretching was possible because the film was readily bursted in the TD direction. Accordingly, the film after washing with water was not stretched and dried at constant length in a hot air of 100° C. Nevertheless, the film was bursted in TD direction. However, one of some sheets tested could luckily be obtained, and the properties of this film are shown in Table 6.

EXAMPLE 11

When the water content of the wet film obtained in Example 3 was measured, 330 parts by weight of water were found to be contained per 100 parts by weight of the polymer. The film containing water was stretched to 1.4-fold in the MD direction according to the same method as in Example 9 and the constant length drying was conducted while blowing hot air of 250° C. against the film under such stretching. The properties of this film are shown in Table 6.

the mechanical properties in the two directions as shown in Table 7, respectively. The film subjected to

TABLE 6

| | Thickness (μm) | Density (g/cm³) | Void number (per mm²) | Light transmittance (%) | (200) plane orientation angle (°) | (010) plane orientation angle (°) | Streak shown in FIG. 2 | Strength at break (Kg/mm²) MD | TD | Elongation at break (%) MD | TD | Modulus (Kg/mm²) MD | TD | ηinh (dl/g) |
|---|---|---|---|---|---|---|---|---|---|---|---|---|---|---|
| Example 9 | 18 | 1.384 | 1.6 | 82 | 50 | 41 | None | 53 | 12 | 9 | 14 | 1360 | 320 | 5.0 |
| Example 10 | 20 | 1.386 | 2.1 | 80 | 93 | 43 | None | 12 | 14 | 18 | 19 | 420 | 350 | 5.1 |
| Comparative example 5 | 28 | 1.396 | Unmeasurable | 1.8 | 38 | 68 | Unmeasurable | 14 | 12 | 7 | 7 | 400 | 380 | 5.0 |
| Comparative example 6 | 5 | 1.400 | 2.5 | 45 | 23 | 27 | Unmeasurable | 62 | 9 | 8 | 2 | 1720 | 430 | 5.2 |
| Example 11 | 16 | 1.383 | 1.2 | 84 | 55 | 41 | None | 51 | 16 | 12 | 20 | 1380 | 480 | 5.5 |

EXAMPLE 12

The film after coagulation formed in Example 9 was immediately taken out and the sulfuric acid content was titrated with 1/10 N-NaOH to be 40%. While permitting this sulfuric acid to remain, the film was stretched according to the same method as Example 9 but it could be stretched only to 1.1-fold. The film stretched to 1.1-fold was washed with water overnight under the fixed state, followed by the constant length drying to obtain a transparent film. The mechanical properties are shown in Table 7 but no improvement of the physical properties by stretching could be seen. However, the film of this example is still within the scope of this invention.

EXAMPLES 13 and 14

A PPTA polymer having ηinh of 4.6 dl/g was dissolved in a solvent comprising 80% of 99.3% sulfuric acid and 20% of chlorosulfuric acid to obtain an optically anisotropic dope at 70° C. This dope was subjected to continuous film preparation by coagulation after optically isotropic conversion by use of the device under the conditions as described in Example 9. By measurement of the water content of the film after water washing, 420 parts by weight of water were found to be contained per 100 parts by weight of the polymer. The film containing water was stretched to 1.6-fold according to the same method as in Example 9 and then dried at constant length in a hot air of 300° C. The film obtained (Example 13) and the film obtained by constant length drying at the same temperature without stretching (Example 14) were transparent, having wet stretching was considerably higher in mechanical properties in the stretched direction without bursting in one direction.

EXAMPLE 15

A PPTA polymer having an ηinh of 5.0 dl/g was dissolved in 99.6% sulfuric acid at 60° C. to a polymer concentration of 11.0% to obtain an optically anisotropic dope at 60° C. The dope had a viscosity 6300 poise at 60° C. The dope was formed into a film on a glass plate at room temperature of 30° C. by an applicator with 0.05 mm stepped difference. The temperature was 30° C. and the relative humidity was 83% and, when left to stand in that atomosphere for 120 seconds, the dope on the glass plate was found to be changed from optically anisotropic to optically isotropic. Immediately thereafter, the dope was put into water to be coagulated therein. The coagulated film was taken out, washed with water of room temperature overnight and the water content was measured. As a result, 380 parts by weight of water were found to be contained per 100 parts by weight of polymer. The film containing water was stretched by the method of Example 9 to 1.4-fold, and dried under such a state with hot air of 250° C. The film obtained was found to be transparent, having the mechanical properties in the two direction as shown in Table 7, without being bursted in one direction.

TABLE 7

| | ηinh (dl/g) | Void number (per mm²) | Light transmittance (%) | (200) plane orientation angle | (010) plane orientation angle | Thickness (μm) | Strength at break (Kg/mm²) MD | TD | Elongation at break (%) MD | TD | Modulus (Kg/mm²) MD | TD | Density (g/cm³) |
|---|---|---|---|---|---|---|---|---|---|---|---|---|---|
| Example 12 | 5.0 | 2.2 | 72 | 72 | 40 | 16 | 16 | 14 | 30 | 32 | 480 | 430 | 1.388 |
| Example 13 | 4.3 | 1.3 | 79 | 44 | 31 | 10 | 45 | 20 | 13 | 23 | 1120 | 360 | 1.384 |
| Example 14 | 4.2 | 0.7 | 81 | 98 | 43 | 11 | 18 | 21 | 25 | 27 | 420 | 440 | 1.385 |
| Example 15 | 4.5 | 1.1 | 75 | 39 | 35 | 8 | 49 | 16 | 10 | 18 | 1180 | 420 | 1.384* |

EXAMPLE 16

A PPTA polymer having an ηinh of 6.5 dl/g was dissolved in 99.7% sulfuric acid to a polymer concentration of 12.0% to obtain an optically anisotropic dope at 60° C. The viscosity of this dope was measured at room temperature to be 16300 poise. For making film fabrication more easily, this dope was degassed under vacuum while maintaining it at about 80° C. Also in this case, the dope had the optical anisotropy as above and had a viscosity of 6400 poise. While maintaining a curved pipe of 1.5 m from a tank through a filter, via a gear pump to a die at about 75° C., the dope was casted from a die having a slit of 0.2 mm×300 mm onto a mirror-polished belt made of Hastelloy (moving at 2 m/minute), with an air of relative humidity of about 90% and temperature of about 85° C. being blown thereagainst, the casted dope was converted optically isotropic (residense time of about 12 seconds) and led together with the belt into an aqueous 10 wt. % sulfuric acid of 0° C. to be coagulated. Then, the coagulated film was peeled off from the belt and washed by running through warm water of about 30° C. The film completed of washing was placed in a tenter dryer and dried at constant length first by a hot air of 150° C. and then a hot air of 220° C. (film A).

On the other hand, the film completed of washing (containing about 320% water per polymer content of the film) was stretched to about 1.5-fold in the width direction at room temperature by means of a tenter, followed by drying in the same manner as the film A to obtain a film which is called film B.

Further, the film completed of washing was stretched to about 1.6-fold in the longer direction at room temperature, followed by drying similarly as the film A to obtain a film which is called film C. The properties of these films are shown in Table 8.

tion of 12.3% to obtain an optically anisotropic dope at 60° C. This dope was degassed under vacuum while maintaining it at about 80° C. Also in this case, the dope had an optical anisotropy and had a viscosity of 5800 poise. While maintaining a curved pipe of 1.5 m from a tank through a filter, via a gear pump to a die at 75° C., the dope was casted from a die having a slit of 0.3 mm×300 mm in Example 17 and 18 or 0.2 mm×300 mm in Example 19 and 20 onto a mirror-polished belt made of tantalum (the distance from the bottom of the die to the belt surface is about 1 cm), with an air of high temperature and high humidity being blown thereagainst, the casted dope was converted to optically isotropic dope and the optically isotropic dope was led together with the belt into water of 10° C. to be coagulated. The temperature and the relative humidity of the blown air and the residence time of the casted dope in the blown air for converting to the optically isotropic dope are shown with the obtained result in Table 9. Then the residence time is controlled by changing the moving speed of the belt.

Subsequently, the coagulated film was peeled off from the belt and washed with warm water of about 30° C., an aqueous 3 wt. % caustic soda of room temperature, and water of room temperature in order. The film completed of washing was placed in a tenter dryer and dried at constant length first by a hot air of 150° C. and then a hot air of 220° C.

Further, in Example 19, the film completed of washing (containing 300 parts by weight of water per 100 parts by weight of polymer) was elongated to 1.5-fold in the MD direction and dried by the same condition as above. Here, Example 19A is the case in which the film is not elongated, and Example 19B is the case in which the film is elongated.

The properties of these film are shown in Table 9.

EXAMPLE 17, 18, 19A, 19B, and 20

A PPTA polymer having an inh of 5.7 dl/g was dissolved in 99.3% sulfuric acid to a polymer concentra-

TABLE 8

| | Thickness (μm) | Density (g/cm³) | Void number (per mm²) | Light transmittance (%) | (200) plane orientation angle (°) | (010) plane orientation angle (°) | Streak shown in FIG. 2 | Strength at break (Kg/mm²) MD | TD | Elongation at break (%) MD | TD | Modulus (Kg/mm²) MD | TD | ηinh (dl/g) |
|---|---|---|---|---|---|---|---|---|---|---|---|---|---|---|
| A | 9 | 1.395 | 0.8 | 82 | 81 | 43 | None | 31 | 29 | 47 | 39 | 880 | 720 | 6.2 |
| B | 8 | 1.397 | 0.6 | 86 | 38 | 40 | None | 16 | 52 | 45 | 17 | 540 | 1280 | 6.1 |
| C | 8 | 1.399 | 1.0 | 86 | 36 | 39 | None | 62 | 18 | 11 | 49 | 1650 | 510 | 6.0 |

TABLE 9

| | Temperature, relative humidity of air | Time for becoming isotropic (sec) | Thickness (μm) | Density (g/cm³) | Void number (per mm²) | Light transmittance (%) | (200) plane orientation angle (°) | (010) plane orientation angle (°) | Fringe shown in FIG. 2 | Strength at break (Kg/mm²) MD | TD | Elongation at break (%) MD | TD | Modulus (Kg/mm²) MD | TD | ηinh (dl/g) |
|---|---|---|---|---|---|---|---|---|---|---|---|---|---|---|---|---|
| Example 17 | 40° C. 86% | 15 | 25 | 1.391 | 1.1 | 85 | 93 | 45 | None | 28 | 29 | 22 | 19 | 780 | 840 | 5.4 |
| Example 18 | 56° C. 81% | 9 | 14 | 1.398 | 0.3 | 86 | 89 | 38 | None | 31 | 29 | 28 | 34 | 870 | 790 | 5.5 |
| Example 19A | 70° C. 98% | 4 | 4.1 | 1.395 | 0 | 89 | 78 | 36 | None | 38 | 31 | 30 | 41 | 950 | 760 | 5.5 |
| Example 19B | 70° C. 98% | 4 | 3.3 | 1.401 | 0 | 90 | 41 | 33 | None | 54 | 22 | 17 | 49 | 1840 | 580 | 5.5 |
| Ex- | 78° C. | 6 | 6.2 | 1.389 | 0.2 | 88 | 84 | 39 | None | 40 | 36 | 37 | 44 | 980 | 860 | 5.4 |

TABLE 9-continued

| | Temperature, relative humidity of air | Time for becoming isotropic (sec) | Thickness (μm) | Density (g/cm³) | Void number (per mm²) | Light transmittance (%) | (200) plane orientation angle (°) | (010) plane orientation angle (°) | Fringe shown in FIG. 2 | Strength at break (Kg/mm²) MD TD | Elongation at break (%) MD TD | Modulus (Kg/mm²) MD TD | ηinh (dl/g) |
|---|---|---|---|---|---|---|---|---|---|---|---|---|---|
| ample 20 | 45% | | | | | | | | | | | | |

We claim:

1. A film consisting essentially of a poly-p-phenyleneterephthalamide having an inherent viscosity ηinh (measured at 30° C. by dissolving 0.2 g of a polymer in 100 ml of sulfuric acid) of 2.5 dl/g or higher, and having the following specific features A to F:
   A. a density of 1.365 g/cm³ to 1.405 g/cm³;
   B. a void number of 5/mm² or less;
   C. a light transmittance of 55% or higher;
   D. a crystal orientation angle in a direction at which diffraction intensity on the (200) plane by X-ray incident at a right angle on a film surface is 30° or more;
   E. a crystal orientation angle on the (010) plane by X-ray incident parallel to a film surface is 60° or less; and
   F. an elongation at break of 9% or higher in the longer direction.

2. A film according to claim 1, wherein no dense fringe pattern is observed when viewed by polarizing microscope.

3. A film according to claim 1, which consists essentially of a poly-p-phenyleneterephthalamide having an inherent viscosity ηinh (measured at 30° C. by dissolving 0.2 g of a polymer in 100 ml of sulfuric acid) of 3.5 dl/g or higher.

4. A film according to claim 1, wherein the light transmittance is 65% or higher.

5. A film according to claim 1, wherein the crystal orientation angle in the direction at which the diffraction intensity on the (200) plane by X-ray incident at a right angle on the film surface becomes maximum is 70° or more.

6. A film according to claim 1, wherein the crystal angle in the direction at which the diffraction intensity on the (200) plane by X-ray incident at a right angle on the film surface becomes maximum is 30° to 70°.

7. A film according to claim 1, wherein elongation at break in all the directions is 9% or higher.

* * * * *